United States Patent [19]
Schollenberger et al.

[11] 3,939,111
[45] Feb. 17, 1976

[54] STABLE POLYURETHANE SOLUTIONS

[75] Inventors: Charles S. Schollenberger, Hudson; Kornelius Dinbergs, Broadview Heights, both of Ohio

[73] Assignee: The B. F. Goodrich Company, Akron, Ohio

[22] Filed: July 1, 1974

[21] Appl. No.: 484,396

[52] U.S. Cl. ..... 260/32.6 NR; 260/32.4; 260/30.8 R
[51] Int. Cl.² ...................... C08K 3/28; C08K 5/20
[58] Field of Search ...... 260/32.6 NR, 32.6 N, 32.4, 260/30.8 R

[56] References Cited
UNITED STATES PATENTS

| | | | |
|---|---|---|---|
| 3,074,911 | 1/1963 | Harper | 260/32.6 NR |
| 3,726,836 | 4/1973 | Nakahara et al. | 260/32.6 NR |
| 3,743,620 | 7/1973 | Frye | 260/32.6 NR |

FOREIGN PATENTS OR APPLICATIONS

| | | | |
|---|---|---|---|
| 46-19871 | 6/1971 | Japan | 260/32.6 N |

*Primary Examiner*—Allan Lieberman
*Attorney, Agent, or Firm*—J. Hughes Powell, Jr.

[57] ABSTRACT

Viscosity stable polyurethane solutions in polar solvents as N,N-dimethylformamide are obtained when such solutions contain small amounts of ammonium salts of strong acids, such salts include ammonium chloride and nitrate.

7 Claims, No Drawings

STABLE POLYURETHANE SOLUTIONS

BACKGROUND OF THE INVENTION

Solid polyurethanes dissolved in solvents have many applications. For example, such polyurethane solutions are used in the manufacture of films, coatings as on fabric, metal and the like, and as adhesives. Unfortunately, in many of these polyurethane solutions the polyurethane begins to degrade in a relatively short time after preparation in the strongly polar solvents often required. Degradation of polyesterurethanes in solutions of

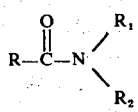

wherein the R's are hydrogen or alkyl groups is particularly bad. Therefore, it is desirable to be able to provide stabilized polyurethane solutions which have good storage life even under relatively high temperature conditions.

SUMMARY OF THE INVENTION

Viscosity stable polyurethane solutions are provided which contain small amounts of ammonium salts of strong acids. The ammonium salts include the salts of the strong inorganic acids including hydrochloric acid, sulfuric acid, nitric acid and the like in amounts of from about 0.01 to 2 or more, preferably 0.05 to 1 percent. Ammonium salts of weak organic acids such as acetic acid are unsatisfactory as stabilizers for the solutions. Preferred materials are ammonium chloride, ammonium sulfate and ammonium nitrate. Ammonium chloride and ammonium nitrate and particularly effective stabilizers for solutions of polyesterurethane in DMF at elevated temperatures such as 65°C. Ammonium acetate is ineffective in this system.

DETAILED DESCRIPTION

The polyurethanes are readily prepared from a variety of compounds having terminal functional groups reactive with organic diisocyanates. Normally used are hydroxyl-terminated compounds. The hydroxyl-terminated compounds or macroglycols usually have molecular weights greater than about 300 to 400. A great variety of such macroglycols have been prepared and proposed for commercial applications. The most commonly used macroglycols are hydroxyl-terminated polyesters, polyethers, polylactones and polybutadienes. In the preparation of one type of elastomeric film and sheet material such macroglycols, alone or in admixture, having molecular weights greater than about 400, and difunctional chain extenders as glycols, are reacted with the organic diisocyanate. Useful materials are obtained by reacting the organic diisocyanate with a mixture of a macroglycol and a small difunctional chain extender such as an alkylene glycol or ether glycol, a cycloaliphatic glycol, or an aromatic-aliphatic glycol; or the so-called prepolymer technique may be used where an excess of organic diisocyanate is first reacted with the macroglycol and then the small difunctional chain extender added, normally in amounts equivalent to react with substantially all of the free isocyanate groups.

The hydroxyl polyester macroglycols are linear hydroxyl-terminated polyesters having molecular weights between about 500 and 4000 and acid numbers usually less than about 10. The polyesters utilized include those prepared by the polyesterification of aliphatic dicarboxylic acids including for example, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 2 to 8 carbon atoms. The phthalic acids are also useful. The glycols used in the preparation of the polyesters by reaction with the dicarboxylic acids are aliphatic glycols containing between 2 and 10 carbon atoms such as ethylene glycol, propanediol, butanediol, hexamethylene glycol, octamethylene glycol, 2-ethylhexanediol-1,6, neopentyl glycol and the like. Preparation of specific polyesterurethanes from polyesters are described in U.S. Pat. No. 2,871,218 for example. Polyesteramides also are contemplated, usually by substitution of a diamine or amino alcohol for at least part of the glycol.

Poly(epsilon-caprolactone)diol macroglycols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4, hexamethylene glycol and the like. Ethylene glycol provides excellent polyesters.

The lactones preferred for preparing the polyesters are epsilon-caprolactones having the general formula

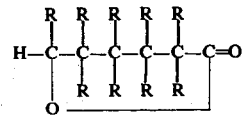

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, γ-methyl-epsilon-caprolactone, β-methyl-epsilon-caprolactone, dimethyl-epsilon-caprolactone and the like. The lactones are polymerized readily by heating with the bifunctional reactant to a temperature of about 100° to about 200°C. Catalysts may be employed if desired. Particularly preferred are poly(epsilon-caprolactone)diols having molecular weights in the range of about 500 to about 5000.

The hydroxyl(polyalkylene oxide), or polyether, macroglycols preferably are essentially linear hydroxyl-terminated compounds having ether linkages as the major linkage joining carbon atoms. The molecular weights may vary between about 500 and 4000. The hydroxyl(polyalkylene oxide)s found useful include hydroxyl poly(methylene oxide)s as hydroxyl poly(tetramethylene oxide), hydroxyl poly(trimethylene oxide), hydroxyl poly(hexamethylene oxide), hydroxyl poly(ethylene oxide) and the like of the formula $HO(CH_2)_nO_xH$ wherein $n$ is a number from 2 to 6 and $x$ is an integer, and alkyl substituted types such as hydroxyl poly(1,2-propylene oxide). Preparation of polyurethanes from these polyethers is described in U.S. Pat. No. 2,899,411 for example.

If small glycols are used as chain extender with the macroglycols and the organic diisocyanate, these normally are aliphatic glycols or ether glycols containing 2 to 10 carbon atoms. Typical glycols which have been employed include ethylene glycol, propylene glycol, butanediol-1,4, hexanediol, 2-ethylhexanediol-1,6, neopentyl glycol and the like. Cycloaliphatic glycols such as cyclohexanedimethanol, and aromatic-aliphatic glycols such as bis-1,4($\beta$-hydroxyethoxy)benzene, may also be employed.

The amount of glycol chain extender used with the macroglycol and the diisocyanate may vary from about 0.1 to 12 mols per mol of macroglycol. Excellent polyurethanes are obtained with a molar ratio of one mol of macroglycol and 1 to 5 mols of the small chain extender glycol. Substituted glycols also may be used.

The organic diisocyanates which are reacted with the macroglycols will include, for example, both aliphatic and aromatic diisocyanates. Such aliphatic diisocyanates include for example, hexamethylene diisocyanate, methylene-bis(4-cyclohexyl isocyanate), isophorone diisocyanate, etc. The aromatic diisocyanates include naphthalene-1,5-diisocyanates, diphenyl methane-4,4'-diisocyanate, tolylene diisocyanate, p-phenylene diisocyanate, dichlorodiphenyl methane diisocyanate, dimethyl diphenyl methane diisocyanate, bibenzyl diisocyanate, diphenyl ether diisocyanates, bitolylene diisocyanates and the like, for example, diisocyanates of the formula

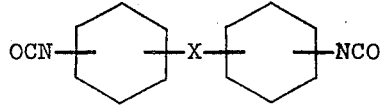

wherein X may be a valence bond, an alkylene radical containing 1 to 5 carbon atoms, NR where R is an alkyl radical, oxygen, sulfur, sulfoxide, sulfone and the like. Also useful are acyclic or alicyclic diisocyanates containing greater than 6 carbon atoms as 4,4'-methylene-bis-(cyclohexyl diisocyanate).

About equimolar ratios of diisocyanate and diols may be used. When a small glycol chain extender is also used, the ratio of reactants employed may be varied from about 1.5 to 13 mols of organic diisocyanate per mol of macroglycol with 0.5 to 12 mols of the glycol. The amount of organic diisocyanate used is dependent on the total amount of glycol chain extender and macroglycol and normally is a molar amount essentially equivalent to the total of these latter two reactants so that there are essentially no free unreacted isocyanate groups remaining in the polymer. Excellent polyurethanes have been obtained when a molar ratio of one mol of macroglycol of molecular weight about 800 to 2500, 1 to 3 mols of glycol, and 2 to 4 mols of the aromatic diisocyanate are caused to react. While essentially equimolar amounts of isocyanate and active hydrogen groups are preferred, it will be understood that an excess of any reactant, preferably less than 10%, as 5%, of excess organic diisocyanate can be used, although larger amounts of diisocyanate can, of course, be used in forming prepolymers. These, of course, have to be kept free of moisture until further reaction with the chain extender component is desired.

Other polyurethane materials that are well known and prepared in a variety of ways as is described in the patent literature may be used. For example, hydroxyl-terminated polyesters, polyesteramides, polyalkylene ether glycols and the like of molecular weights from about 800 to 3000 or higher are reacted with organic isocyanates, generally with an excess of the diisocyanate. The resulting polyurethane elastomers may be cured or vulcanized by adding additional organic diisocyanate whereas only a slight excess of isocyanate is used to make the polyurethane; or if a substantial excess of organic diisocyanate is used in making the polyurethane, then the isocyanateterminated polyurethane is mixed or treated or exposed to such amounts of polyfunctional additives such as water, diamines, glycols, and the like that will result in its curing or vulcanization. The excess diisocyanate present or added is in amounts from about 1 to 25%, preferably 3 to 15 weight parts per 100 weight parts of polyurethane. Regardless of the source of the polyurethane, the process of this invention may be used for solutions.

Solvents used are any of those known to those skilled in the art for dissolving polyurethanes, which normally are polar solvents including substituted amides such as N,N-dimethylformamide and N,N-dimethyl acetamide. The invention is, in general, useful where solvents having the general formula

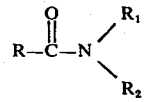

where R is hydrogen or alkyl, are used.

EXAMPLES

A 30% polyurethane solution was prepared by dissolving a polyurethane in dimethylformamide. The polyurethane is a polyesterurethane prepared from 1 mol of a poly(tetramethyleneadipate) polyester of 1050 molecular weight, 2.0 mols of butanediol with an equal molar proportion of diphenyl methane diisocyanate. In two portions of this solution there are separately dissolved 0.1 weight percent of ammonium sulfate and 0.1 weight percent of ammonium nitrate. The Brookfield viscosity of these two solutions, and a control containing no ammonium salt, was determined at room temperature using spindle 5 at 5 rpm and found to be 43,400 cps for the control, 42,600 cps for ammonium sulfate and 44,800 cps for ammonium nitrate. The samples were heated at a temperature of 69°C. for 72 hours, cooled to room temperature and the Brookfield viscosity determined again. The control was 23,900 cps, only 55% of the original viscosity, that of the ammonium sulfate was 30,800 cps, 72% of the original viscosity, and for the ammonium nitrate, 41,000 cps, 92% of the original viscosity value. The behavior of the control clearly shows that the polymer was degraded during this aging period by the substantial decrease in the molecular weight of the polyesterurethane containing no ammonium salt.

A 30% solution of the polyesterurethane of Example I was prepared into which there was dissolved (1) 0.1 weight percent ammonium chloride and (2) another 0.2 weight percent ammonium chloride. Using spindle 5 at 5 rpm, Brookfield Viscometer, the Viscosity at room temperature of the 0.1 weight percent of the ammonium chloride solution was 49,120 cps and that of the 0.2% was 48,560 cps. After aging in a 70°C. oven for 3 days and cooled to room temperature for testing, it was found that the viscosity of 0.1 weight percent solution was 41,600 cps and that of the 0.2 weight percent solution was 40,400 cps, retaining 84.5% and 82.2% of the original unaged viscosity of the solutions.

Among the advantages of this invention is that solutions may be made more readily by heating the mixture of polyurethane and solvent without fear of degradation which would be of concern in the absence of the ammonium salt. Further, in processes where warm solutions are required the stabilized solutions of this invention may be heated for longer periods of time without degradation than solutions not containing the ammonium salt. These stabilized solutions find particular utility in coating and impregnating fabrics useful, for example, in upholstery, outer garments as in coats and shoe fabrics.

We claim:

1. A solution of polyurethane in a solvent having the general formula

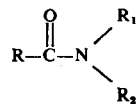

wherein the R's are hydrogen or alkyl containing a viscosity stabilizing amount of about 0.01 to about 2% of an ammonium salt of an inorganic acid selected from the group consisting of ammonium chloride, ammonium nitrate, and ammonium sulfate.

2. A solution of claim 1 wherein the polyurethane is a polyetherurethane.

3. A solution of claim 1 wherein the polyurethane is a polyesterurethane.

4. The solution of claim 2 wherein the ammonium salt is ammonium chloride or ammonium nitrate present in amount of about 0.05 to 1%.

5. The solution of claim 3 wherein the ammonium salt is ammonium chloride or ammonium nitrate present in amount of about 0.05 to 1%.

6. The solution of claim 4 wherein the solvent is dimethylformamide.

7. The solution of claim 5 wherein the solvent is dimethylformamide.

* * * * *